United States Patent [19]

Fensom

[11] 4,295,878
[45] Oct. 20, 1981

[54] PROCESSES OF IRON SEGREGATION

[75] Inventor: Donald J. Fensom, South Yarra, Australia

[73] Assignee: ICI Australia Limited, Melbourne, Australia

[21] Appl. No.: 83,516

[22] Filed: Oct. 10, 1979

Related U.S. Application Data

[63] Continuation of Ser. No. 922,351, Jul. 6, 1978, abandoned.

[30] Foreign Application Priority Data

Jul. 8, 1977 [AU] Australia ............................. PD0750

[51] Int. Cl.³ ................................................ C22B 1/8
[52] U.S. Cl. ........................................ 75/1 T; 75/34
[58] Field of Search ........................ 75/1 R, 1 T, 3-5, 75/21, 29, 33-37, 62, 63, 68 R, 68 A, 72, 82, 84, 89, 90 R, 90 HP

[56] References Cited

U.S. PATENT DOCUMENTS

| | | | |
|---|---|---|---|
| 3,148,974 | 9/1964 | Rampacek | 75/72 |
| 3,725,043 | 4/1973 | Kawai et al. | 75/72 |
| 3,761,245 | 9/1973 | Bingham | 75/82 |
| 3,802,868 | 4/1974 | Cech | 75/72 |
| 3,859,077 | 1/1975 | Othmer | 75/1 T |
| 3,876,415 | 4/1975 | Bell, et al. | 75/82 |
| 3,914,123 | 10/1975 | Davidson | 75/1 R |
| 4,062,675 | 12/1977 | Dor | 75/82 |

FOREIGN PATENT DOCUMENTS

| | | |
|---|---|---|
| 473854 | 9/1974 | Australia. |
| 477800 | 1/1975 | Australia. |
| 2547574 | 4/1976 | Fed. Rep. of Germany. |
| 827470 | 2/1960 | United Kingdom. |
| 827471 | 2/1960 | United Kingdom. |
| 396368 | 1/1974 | U.S.S.R. ................................ 75/21 |

OTHER PUBLICATIONS

Shomate, C. H., et al.; "Thermodynamic Properties of Ilmenite and Selective Reduction of Iron in Ilmenite", U.S. Bureau of Mines R.I.3864 pp. 15-19 (5/46).
Roberts, J. M. C.; "Ilmenite Upgrading" *Mining Magazine*, vol. 125, No. 6, pp. 543, 545, 547, 549-551 (12/71).
Tittle, K., et al.; "Segregation of Iron from Ilmenite", *Trans. Min. Metall.* vol. 82, pp. C135-139 (1973).
Zegers, T. W., et al.; *Beneficiation of Ilmenites by Segregation Rousting*, paper presented Canadian Inst. of Min. and Metal., pp. 1-19 (4/10/72).

*Primary Examiner*—Michael L. Lewis
*Attorney, Agent, or Firm*—Cushman, Darby & Cushman

[57] ABSTRACT

Beneficiation of ilmenite using a process comprising first reducing by a known process the iron component thereof to metallic iron to form particles containing a mixture of iron and titanium oxide and then treating these particles with an iron salt or a precursor thereof, at an elevated temperature, to segregate the iron from the titanium-bearing component. The segregated iron is separated from the titanium bearing component by physical or chemical means.

16 Claims, 4 Drawing Figures

PROCESSES OF IRON SEGREGATION

This is a continuation, of application Ser. No. 922,351 filed July 6, 1978, now abandoned.

This invention relates to the beneficiation of metal-bearing materials and more particularly the invention relates to the beneficiation of materials which comprise titanium oxide.

It has been proposed to beneficiate non-ferrous metal values of oxide-containing materials comprising iron oxide. Thus for example in Australian Patent Specification No. 473 854 there is described a one step process in which such materials in the form of ore are heated in the presence of hydrogen chloride, an alkali metal halide flux and sufficient carbonaceous material to achieve metallisation of the iron present in the ore, at a temperature sufficiently high to selectively reduce the iron oxide component to segregated metallic iron particles leaving the non-ferrous metal oxides partially reduced, and separating the metallic iron so formed by physical means. Whilst such processes have some utility it has been found in commercial practice that the requirements for efficient metallisation were found to hinder the segregation of the metallic iron particles and vice versa.

In contradistinction to this prior art of beneficiation which teaches as essential to the process the use, in combination, of a flux, a source of carbon and hydrogen chloride it has now been found to be advantageous to beneficiate metal bearing materials in a multi-step, preferably a two-step, process. Further this multi-step process comprises a process which does not require as essential the use of any of a flux, a source of carbon and hydrogen chloride, although any or all of these materials may be used optionally in the process of the invention.

It has been disclosed in Australian Patent Specification No. 247 110 to use a multistep process for the beneficiation of ilmenite wherein the ilmenite is reduced to form metallic iron and then this iron is leached out by rusting leaving behind relict particles of titanium oxide. The shortcoming of this process is that generally reduction of ilmenite causes the metallic iron to form as very small particles evenly dispersed and in intimate association with a matrix of titanium oxide in the reduced ilmenite particles. It is impractical to separate the metallic iron from the titanium oxide by physical methods and chemical methods have to be used which have the disadvantage that the metallic iron is converted in the process to a less desirable iron compound.

We have now found that the metallic iron which is in intimate association with titanium oxide as is usually obtained by reducing ilmenite can be caused to segregate from within the particles so that it is easily separable from the titanium oxide; such segregation is effected by heating the particles in an environment comprising an iron salt.

Accordingly the present invention provides a process for the beneficiation of particles of titaniferous material comprising as a first component titanium oxide and as a second component metallic iron, said first and second components being in intimate association in said particles as hereinbefore defined which process comprises subjecting said particles to a non-oxidising environment comprising an iron salt vapour at an elevated temperature so that at least part of the said metallic iron is segregated by translocation from within said particles to the outside of said particles and separating the thus segregated metallic iron and relicts of said particles.

Throughout this specification the term segregation is used to describe the translocation of the metallic iron contained within a particle of titaniferous material to a location outside the particle but within the mass of titaniferous particles being subjected to the segregation step of the process of the present invention. We use the term separation to describe the removal of the segregated metallic iron from the mass of titaniferous particles.

The process of the invention is useful for the beneficiation of many titanium-bearing materials. Such materials include, for example, those derived from titanium-bearing ores generally called "ilmenite" which term includes the compound ilmenite, $FeTiO_3$, and other ores having the ilmenite structure such as $(Fe,Mn,Mg)TiO_3$ as well as oxidised forms of the ores containing iron in the ferric state and weathered forms of the ores. Other names given to these ores include ulvospinel, arizonite, pseudobrookite, titanomagnetite and kalkowskyn for example. Other suitable titaniferous materials include any of the above which also contain iron oxide inclusions, as well as materials described as iron sands. The titanium-bearing ores usually occur in beach sand or as rock deposits.

The process used to obtain the particles of titaniferous material comprising titanium oxide and metallic iron to which the process of our invention is applied is not critical to the process of the invention. Conveniently the reduction procedure used to convert the iron-bearing substance to metallic iron may be a conventional procedure and may be performed in known apparatus. Suitably the reducing agent may be an agent conventionally used to reduce metallic compounds to a metallic state. Typical agents include hydrogen, carbon monoxide or mixtures thereof and such agents are used conveniently in a gaseous form. Alternatively it is often convenient to use solid carbonaceous material or solid material which acts as a precursor of a reducing agent under the reaction conditions of the process. Such solid materials are known and as a typical example thereof mention is made of activated carbonaceous products such as steam activated brown coal char. The titanium-bearing material should be reacted with the reducing agent at a temperature which is sufficiently high to ensure that at least a part, and preferably all, of the iron-containing substances therein are reduced to a metallic state. This temperature will vary to some extent dependent on the nature of the titanium-bearing material and the reductant but for most such materials suitable temperatures lie in a range from 500° to 1300° C. and temperatures in a range from 800° to 1200° C. are commonly used. The time of treatment of the titanium-bearing material with the reducing agent will depend to some extent on the amount of contact between the material and the reducing agent. For various methods of making contact, the desirable time of treatment is best determined by experimentation and progressive analysis of the material for the amount of iron therein during the treatment period. The time during which the reducing step is performed varies greatly. Thus in some procedures such a time may be of the order of days, and again when a fluidized bed is used only a few minutes may be necessary to achieve metallization and this time may be reduced still further when a plasma is used.

It is not essential but is a desirable option that the conditions in the reduction process used to produce the titaniferous material used in the process of the present invention are such that this titaniferous material comprises titanium oxides in which the titanium is substantially present as Ti(IV). Ideally the conditions should be that the $pO_2$ in the reduction process should be consistent with that required for complete reduction of the iron compounds and minimum reduction of the Ti(IV) compounds. Desirably any Ti(III) in the product from the reduction process may be oxidised to Ti(IV) to provide a starting material for the process of the present invention having a high Ti(IV) content.

Suitably the iron salt used is selected from the group comprising the ferrous halides. Preferably the ferrous halide is ferrous chloride although other ferrous halides such as ferrous fluoride, bromide and iodide may be used either alone or as a mixture of ferrous halides. When the iron salt is used as the sole chemical reagent in the segregation step it is found that the metallic iron is translocated from the interior of the particles to form separate particles in the reaction mass or is deposited as a shell on the exterior surface of the particles from where it may be removed by attrition or chemical means. The efficacy of the segregation step may be enhanced if an "iron attractant" is used in combination with the iron salt. Thus in one convenient form of the invention the iron salt may be used in the presence of a source of carbon which may be for example a gas such as carbon monoxide, or a solid such as coke, graphite or a carbon bearing alloy. In another embodiment of the invention it is convenient to use in conjunction with the iron salt a material capable of forming a solid or liquid alloy or compound with iron. Such materials are often referred to as "iron-sinks" and typical examples of such materials include gases such as nitrogen, non-metallic elements such as boron, phosphorus, silicon or sulphur, or metals, especially transition metals such as nickel or copper. Such "iron-sinks" may be used individually, or as mixtures, or may form part of an alloy.

It also lies within the invention to use "solvents" for the iron salt particularly when the operating conditions are such that there is a tendency for the iron salt to be distilled out of the segregation zone. For example, if ferrous chloride is used in the segregation process, the addition of sodium chloride, potassium chloride, calcium chloride or magnesium chloride may be beneficial.

Whilst the iron salt vapour may be generated as a result of the addition of the iron salt itself an iron salt precursor which is capable of generating the desired iron salt vapour in situ may be added. Thus for example a ferrous halide vapour may be generated by the reaction of the metallic iron in the titaniferrous material at an elevated temperature with a halide, such as hydrogen chloride or hydrogen bromide, or with a halogen such as chlorine, fluorine, bromine or iodine, or a ferric halide.

The segregation step of the process of the invention should be performed in the presence of an inert gas, such as argon or nitrogen or a non-oxidizing gas which suitably may be carbon monoxide. By non-oxidizing we mean a gas which provides an atmosphere such that under the given operating conditions which may be calculated from thermodynamic data of temperature and pressure the metallic iron and titanium oxides may co-exist.

The segregation step should be performed at a temperature which is sufficiently high to ensure that some vaporized iron salt is present during segregation. Preferably the vapour pressure of the iron salts is $>10^{-3}$ atmos. Thus the temperature should be at least high enough to ensure that the iron salt is in a molten form and preferably should be sufficiently high to ensure that an adequate amount of iron salt vapor is present. However, the temperature should not be so high that a substantial amount of incipient fusion occurs in the titanium oxide phase. When ferrous chloride is used as the iron salt it has been found desirable to perform the segregation step at temperatures in a range from 700° to 1200° C. and preferably at temperatures below 1000° C. The segregation step may be performed at atmospheric pressure, but it lies within the invention that pressures either above or below atmospheric pressure may be used during this step.

It will be appreciated that with the segregation reaction of this invention that complete translocation of the metallic iron from within the particles may in some circumstances not take place in one pass. It is anticipated that in an embodiment of the invention only part of the metallic iron may be segregated and then this segregated part of the iron is separated from the bulk of the relict titaniferous particles by any known means. The thus partially beneficiated titaniferous particles may be returned to the start of the segregation step and the process repeated to beneficiate further the titaniferous particles.

In one preferred method for performing the segregation step use is made of a tubular reaction vessel which is fabricated from a refractory material such as aluminium oxide, or from a nickel alloy such as that available under the registered trade name of "Inconel" alloy 601 and which is believed to comprise 58 to 63% w/w nickel, 21 to 25% w/w chromium and the balance essentially iron. It is preferred to use the reaction vessel in a position such that the longer dimension of the tube is substantially vertical with a closed end at its lower extremity although other positions for the vessel may be used if desired. The tube is fitted with closable ports to facilitate the introduction, circulation or retention of gases in the tube. A port is also provided about mid-way along the length of the tube for the introduction of iron salt, solvent and any carbonaceous or iron attractant materials to be used therewith. The particles to be treated are located in the lower end of the tube together with the iron salt reagent and any auxiliary material. When heat is applied to this lower end to form a "hot zone", some of the vaporized iron salt rises to an "intermediate heat zone" in the mid regions of the tube and then to a "cold zone" where the vapour condenses. The tube thus performs as a reaction vessel having a reflux condensing means and thus reduces losses of iron salt through volatilization.

In another method of performing the process of the invention the apparatus may take the form of a multiplicity of compartments which are interconnected by conduit means and provided with means whereby vapour may be circulated through the compartments at an elevated temperature.

In performing the segregation step of the process using this form of apparatus a first series of one or more compartments is loaded with the prereduced particles containing the metallic iron and a second series of one or more compartments is loaded with an amount of carbonaceous or "iron-sink" material. Suitably the compartments of the first series and of the second series may be in an alternating order. An amount of iron salt, or a precursor therefor, is placed into the apparatus, vaporized iron salt is formed therein and the vapour so produced is circulated by the vapour-circulating means, which conveniently may be a fan or a gas pump, so that the vapour is brought into contact with the contents of the compartments whereby the iron present in the first series of compartments is transferred progressively to the second series of compartments where at least part of the transferred iron reacts with the carbonaceous or "iron-sink" material present therein. By this procedure the iron is segregated from the iron-bearing component and the segregated iron is thereby transported to another site where it is conveniently converted to other iron-bearing products such as for example valuable ferro-alloys. In this embodiment of the process of the invention segregation and separation of the iron and the titanium-bearing component are effected concurrently by physico-chemical and pneumatic means. However when the process of the invention is carried out in such a manner that the segregation step is a discrete step from the separation step, the segregated iron particles and the titanium-bearing particles being present as a mixture of discrete entities in the one vessel, separation thereof may conveniently be by physical means.

Generally the degree of segregation achieved by the process of this invention is sufficient to liberate the metallic iron particles with only light grinding. Thus the original particle size of the titaniferous material may be maintained. This is an important advantage when the beneficiated titanium oxide material is to be used as a feedstock in the well-known "chloride-route" for the manufacture of $TiO_2$ pigment. A particularly useful method of separation is to subject such a mixture of particles after segregation and light grinding to the action of magnetic force whereby fractions containing differing proportions of iron particles and titanium-bearing particles may be obtained. Another method of separation which may be applied is to use size separation techniques such as screening. This method is of particular application when an iron attractant is used which is in a particulate form, the particles being markedly larger than the particles of the titaniferous material to which the process of the invention is applied.

Other separation techniques, known to those skilled in the art, such as gravity separation, electrostatic separation and flotation, may be used. Alternatively the segregated iron may be removed by chemical means.

BRIEF DESCRIPTION OF THE DRAWINGS

FIG. 1 is a diagrammatic representation of a flow sheet of a commercial scale process for the beneficiation of beach sand ilmenite which includes as an essential operation an embodiment of the process of the present invention. A batch of beach sand ilmenite 1 is fed into a reduction plant 2 in which substantially all its iron oxide component is reduced to the metallic state by heating it in a reducing environment. The hot product 3 from the reduction plant 2 is fed into a segregation reactor 4. Ferrous chloride from a holding vessel 5 and an iron attractant from a holding vessel 6 are also fed into the segregation reactor 4 which is maintained for 3 hours at the desired temperature between 700° and 900° C. by an auxiliary heating means, if necessary. The product from the segregation reactor after the ferrous chloride has been substantially removed from it by distillation and stored in the holding vessel 5, is cooled in coolers 7 in a non-oxidising atmosphere. The product from the coolers 7 is passed through a magnetic separator 8 which splits it into three fractions, a non-magnetic fraction 10 comprising relict particles of titanium oxide having a low iron content, a magnetic fraction 11 comprising particles of metallic iron in association with the iron attractant used and an intermediate fraction 12 comprising particles of titanium oxide which contain sufficient metallic iron to make them weakly magnetic. The non-magnetic fraction 10 is the desired beneficiated titanium oxide product. The magnetic fraction 11 is treated by a process, not shown in FIG. 1 to remove the metallic iron from the iron attractant, and the latter is recycled to the holding vessel 6. The intermediate fraction 12 is recycled to the segregation reactor 4 and added to a subsequent batch of hot products 3 from the reduction plant 2.

Figure 1:
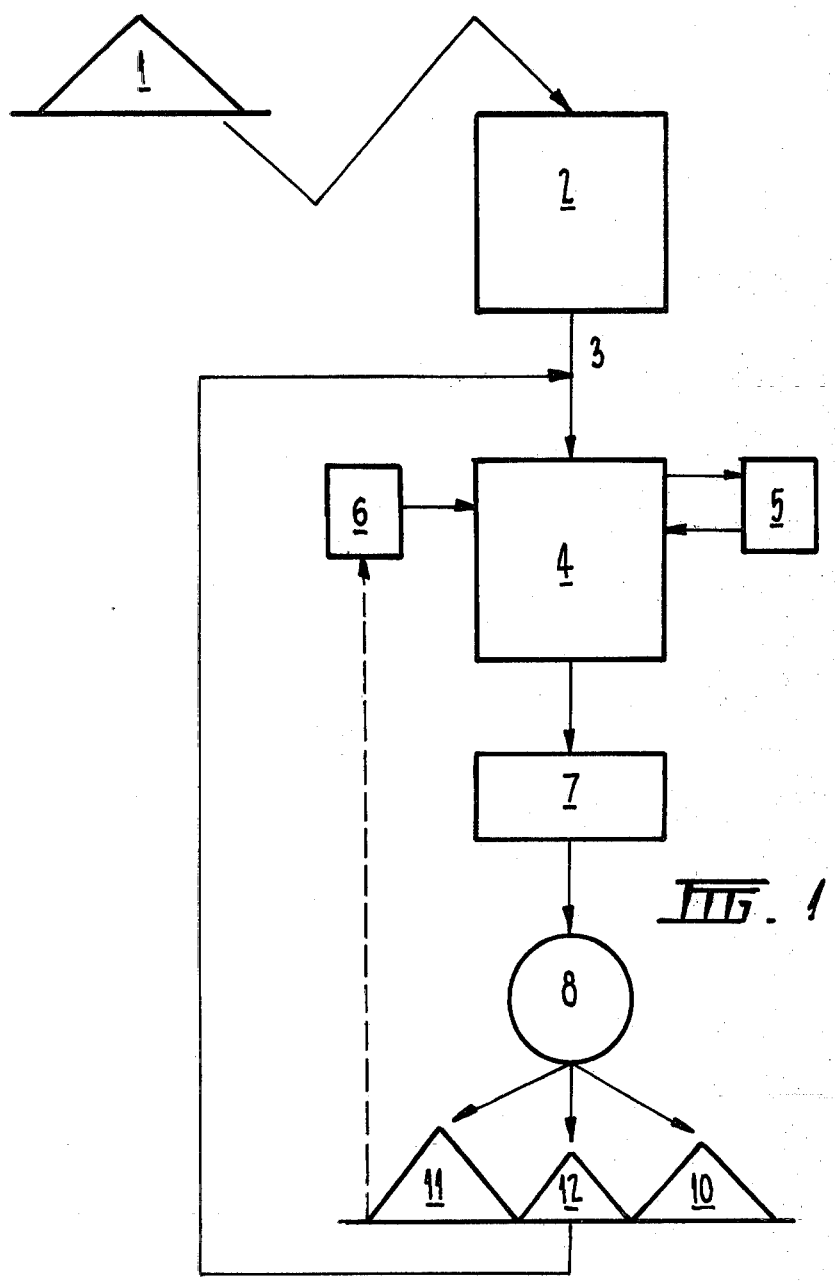
FIG. 1 is a flow sheet.

In this embodiment of the process of the invention the operations have been described as taking place batchwise. It will be recognised by those skilled in the art that it is also possible to carry out embodiments of the process of the invention as continuous operations.

The invention is now illustrated by, but is not limited to, the following examples in which all parts and percentages are on a weight basis unless otherwise specified.

In examples 1 to 5 the titaniferous material to which various embodiments of the process of the invention were applied was prepared in the following manner:

200 parts of a beach-sand ilmenite which contained 32.8% titanium and 31.3% iron and was in the form of particles having an average size of 160 microns was placed in a reaction vessel and treated at a temperature of approximately 1200° C. with a stream of hydrogen so that 98.6% of the iron-bearing component of the said beach-sand ilmenite was reduced to a metallic state.

The product so obtained was in the form of particles of approximately the same size as the original beach-sand ilmenite. Microscopic examination of sections of these particles revealed that these particles themselves generally were composed of a large number of very small (>5 micron) particles of metallic iron embedded in a matrix comprising titanium oxide.

EXAMPLE 1

20 parts of particulate reduced beach-sand ilmenite produced by the method hereinbefore described was mixed with 1.5 part of powdered graphite and 20 parts of hydrated ferrous chloride and the mixture so formed was placed in a crucible located inside a vertical reaction tube fabricated from "Inconel" alloy 601. The mixture was heated to a temperature in a range from 1150° to 1200° C. during which time a stream of argon was fed to the reaction tube. When the above temperature was attained, the flow of argon was stopped, the reaction vessel was sealed and the material in the crucible was maintained in the above temperature range for 200 minutes. The crucible and its contents were then removed from the reaction tube, and the contents were washed with water and dried. Microscopic examination of the dried contents so obtained showed that the major proportion of metallic iron was segregated as discrete grains remote from those grains which were essentially titanium oxide. When a sample of the dried contents was subjected to a magnetic separation treatment there was obtained a magnetic fraction which constituted 72.6% of the contents whilst the remainder comprised essentially a non-magnetic material. Most of the excess graphite was removed from the dried contents which were then ground and subjected to a magnetic separation treatment. The ground, separated product was divided into an essentially magnetic fraction which constituted 52.6% of the product and a residual essentially non-magnetic fraction comprising titanium oxide and which contained a small amount of magnetic material.

EXAMPLE 2

The general procedure of Example 1 was repeated except that in the present example the amount of reduced ilmenite particles which was treated in the segregation step of the process was increased to 40 parts, the amount of graphite was increased to 3 parts and the argon of Example 1 was replaced by carbon monoxide. Microscopic examination of the product showed that the segregation of the metallic iron from the titanium oxide component was similar to that obtained in Example 1. The ground separated product had an essentially non-magnetic fraction which constituted 57.2% of the product and which contained 2.8% of metallic iron and 57.8% of titanium.

EXAMPLE 3

The general procedure of Example 1 was repeated except that the graphite of that example was replaced by 5 parts of an iron carbon alloy. The dried contents of the crucible showed segregation of the metallic iron component which was similar to the segregation obtained in Example 1, and in an unground form the magnetic fraction constituted 66.2% of the product so obtained.

EXAMPLE 4

The general procedure of Example 3 was repeated except that the iron/carbon alloy of that example was replaced by 5 parts of powdered nickel. The segregation of the metallic iron particles from the titanium oxide particles was similar to that obtained in Example 3.

Microscopic examination of sections of particles in the product from the segregation step showed that nickel/iron alloy particles were formed which were clearly distinct from the relict titanium bearing particles. The nickel/iron alloy particles were removed, without the need to grind the product from the segregation step, by application of a magnetic field. The magnetic fraction constituted 57% of the product.

EXAMPLE 5

To 10 parts of the product of the hereinbefore described hydrogen reduction of ilmenite there were added 6 parts of sodium chloride, 2 parts of hydrated ferrous chloride, and 1 part of metallurgical coke and the mixture so prepared was heated in an atmosphere of carbon monoxide for four hours at a temperature in the range from 1000° to 1200° C., then the contents of the reaction vessel were cooled to room temperature, washed with water to remove water soluble salts and dried to provide a product wherein the metallic iron and titanium-bearing components were segregated. The dried material so obtained was divided into an essentially non-magnetic fraction, an essentially magnetic fraction and a fraction which had magnetic properties intermediate of the other fractions, the fractions being in a weight ratio of 50:44:6. The non-magnetic fraction contained 91% of the titanium present in the ilmenite and had an iron content of 6.6%.

Another sample of beach sand ilmenite was reduced in the following manner to prepare the titaniferous starting material for examples 6 and 7:

500 parts of the beach sand ilmenite were mixed with 100 parts of active brown coal char. The mixture was placed in an open topped reaction vessel and heated for 80 minutes at a temperature in a range from 1120° to 1170° C. during which time substantially all of the iron oxide component of the ilmenite was reduced to metallic iron.

Microscopic examination of the product of this reduction process showed that the particles of reduced ilmenite had similar structure to those obtained by hydrogen reduction, i.e. they comprised small particles of metallic iron embedded in a matrix of titanium oxide.

EXAMPLE 6

300 parts of sodium chloride and 75 parts of hydrated ferrous chloride were added to and mixed with the product of the brown coal char reduction of ilmenite. The mixture so obtained was heated in an atmosphere of carbon monoxide for two hours in a furnace at a temperature in a range from 1160° to 1180° C. and was then cooled, washed with water to remove residual water-soluble salts and dried. Microscopic examination of the dried product showed substantial segregation of the metallic iron component from the titanium-bearing component. The product so obtained was separated into an essentially non-magnetic, an essentially magnetic and intermediately magnetic fractions. The non-magnetic fraction constituted 54% of the dried product and contained more than 80% of the total titanium content of the original ilmenite which was treated, and also contained 6% of iron. The magnetic fraction contained 4% of titanium.

EXAMPLE 7

863 parts of the product of the hereinbefore described process of reduction of ilmenite were added to and blended with 580 parts of sodium chloride. The resultant blend was placed in an open topped reaction vessel and transferred to a furnace which was heated to a temperature in a range from 1140° to 1150° C. A mixture of carbon monoxide and hydrogen chloride in a volume ratio of 2.5:1 was fed into the furnace wherein it came into contact with the contents of the reaction vessel. After 2.25 hours the reaction vessel and its contents were removed from the furnace and allowed to cool to room temperature. The contents of the vessel were washed with water until they were free of sodium chloride and were then dried to provide a product in which most of the metallic iron component was segregated from the titanium-bearing component. The product so obtained was subjected to the effect of a magnetic field whereby three fractions were obtained. The first fraction constituted 37% of the dried contents and was substantially non-magnetic; the second fraction constituted 18% of the dried contents and was essentially magnetic; whilst the third fraction was a fraction which was intermediate in magnetic properties in comparison with the other fractions and constituted 45% of the dried contents. The non-magnetic fraction was calcined and the calcined product so obtained contained 55.8% of titanium (equivalent to 93% expressed as $TiO_2$) and 2.2% of iron. The magnetic fraction contained 0.8% of titanium and the remainder of this fraction was essentially metallic iron.

EXAMPLES 8–10

A sample of ground, oxidised Norwegian rock ilmenite was reduced with hydrogen at 760°–780° C. until a substantial portion of the iron oxide content was converted to the metallic state.

Microscopic examination showed that the particles were similar to those obtained from the reduction of beach sand ilmenite. These particles were magnetic. 100 parts of this reduced Norwegian ilmenite were heated at 800° C. in the presence of $FeCl_2$, derived from $FeCl_2 4H_2O$, and iron attractants in the proportions indicated in Table 1. Magnetic separation of the product of the segregation reaction gave non-magnetic, intermediate and magnetic fractions. The amount of non-magnetic material recovered in each example is recorded in Table 1.

TABLE 1

| | Segregation of reduced rock ilmenite | |
|---|---|---|
| Example Number | Iron attractants (parts by weight) | Percentage of product recovered in non-magnetic fraction |
| 8 | — | 55% |
| 9 | Coke (40) | 46% |
| 10 | Nickel (16) | 64% |

Microscopic examination revealed that the non-magnetic fractions in all three examples comprised beneficiated titanium oxide and were essentially free of metallic iron and coke.

EXAMPLES 11–17

The following exemplify embodiments of the process of the invention in which nickel is used as the iron attractant and $FeCl_2$, introduced by various means, as the segregating agent. The examples demonstrate the efficacy of the process of the invention as applied over a segregation temperature range from 700° C. to 1000° C. using samples of oxidised beach sand ilmenite which have been reduced with hydrogen over a temperature range from 770° C. to 1200° C. In examples 11–15 the $FeCl_2$ was derived from $FeCl_2 4H_2O$. In example 14 the $FeCl_2$ was mixed with sodium chloride. In examples 16 and 17 the $FeCl_2$ was generated in situ by the introduction of gaseous HCl and $Cl_2$ respectively, at the segregation temperature into the segregation vessel.

Magnetic separations of the products obtained in these experiments yielded non-magnetic, intermediate and magnetic fractions. The yield of titanium in the non-magnetic fraction in each example is shown in Table 2.

TABLE 2

| | Segregation of reduced beach sand ilmenite | | | |
|---|---|---|---|---|
| Example Number | Reduction Temperature (°C.) | Segregation Temperature (°C.) | Precentage of total Ti recovered in non-magnetic fraction | Beneficiation Number |
| 11 | 1200 | 1000 | 94% | 1.41 |
| 12 | 1000 | 1000 | 85% | 1.55 |
| 13 | 800 | 1000 | 90% | 1.38 |
| 14 | 800 | 800 | 97% | 1.29 |
| 15 | 770 | 700 | >85% | >1.5 |
| 16 | 800 | 800 | 86% | 1.5 |
| 17 | 850 | 800 | >90% | >1.5 |

Microscopic examination showed that the non-magnetic fractions in all examples comprised titanium oxide and were essentially free of metallic iron and nickel. The beneficiation number is defined herein as the percentage by weight of titanium in the non-magnetic product divided by the percentage by weight of titanium in the reduced ilmenite used as the feed material to the segregation process.

A beneficiation number greater than unity indicates beneficiation has occurred. By way of comparison it was found that when the temperature at which the reduced ilmenite as used in example 14 was heated in the presence of ferrous chloride was only 600° C. no non-magnetic fraction was able to be separated, hence no beneficiation was deemed to have occurred.

EXAMPLES 18–23

Beach sand ilmenite was reduced with hydrogen at 760°–780° C. until a substantial portion of the iron oxide content was converted to the metallic state. In each example, 100 parts of this reduced, beach-sand ilmenite were heated in the presence of iron salts at temperatures as indicated in Table 3. In examples 18–22, the iron salt was $FeI_2$. In example 23 a mixture of $FeI_2$ and $FeBr_2$ was used as the iron salt. The attractants used are shown in Table 3.

TABLE 3

| | Segregation using ferrous iodide | | |
|---|---|---|---|
| Example Number | Temperature °C. | Iron Attractants | Yield of beneficiated titanium oxide |
| 18 | 800 | — | 95% |
| 19 | 800 | Coke | >84% |
| 20 | 800 | Ni | 82% |
| 21 | 600 | — | 88% |
| 22 | 600 | Ni | 80% |
| 23 | 600 | Coke | >51% |

Magnetic separation of the washed products of the segregation reactions gave non-magnetic, intermediate and magnetic fractions.

Microscopic examination revealed that the non-magnetic fractions comprised beneficiated titanium oxide and were essentially free of metallic iron. The yields quoted in Table 3 have been calculated from the amount of non-magnetic material recovered expressed as a percentage of the titanium oxide component in the reduced ilmenite.

Figure 2:
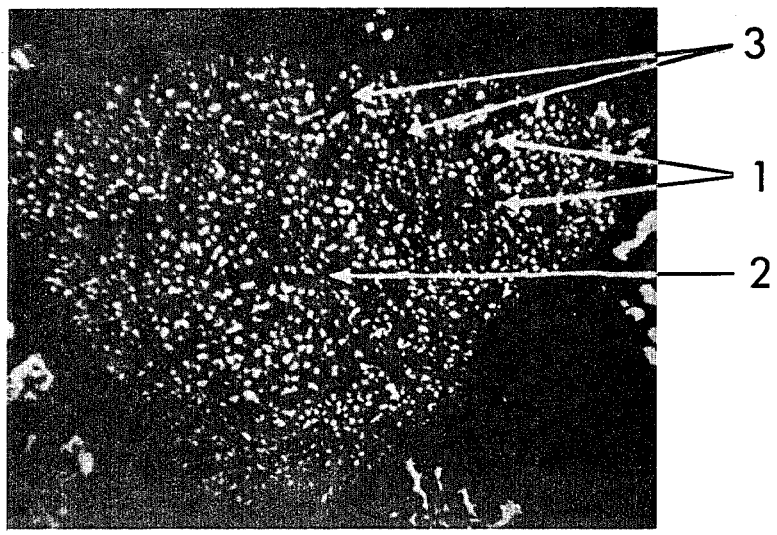
FIG. 2 is reduced Ilmenite.
Figure 3:
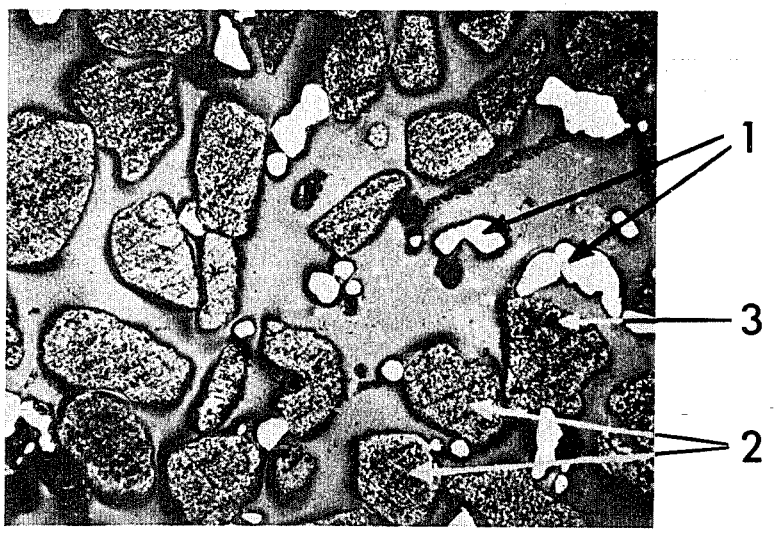
FIG. 3 is the invention without attractant.
Figure 4:
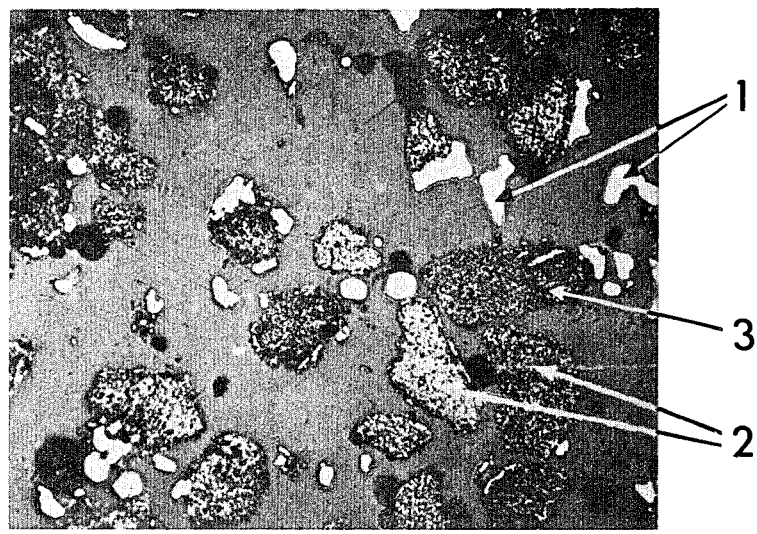
FIG. 4 is the invention with attractant.

FIGS. 2, 3 and 4 are reproductions of microphotographs of sections of particles which illustrate the phenomenon of segregation as it occurs in the practice of embodiments of the present invention.

Under the conditions employed to obtain the microphotographs metallic iron shows up as the white areas I. The titanium oxide material is by contrast shown as the light gray areas 2. The darker gray areas 3 show where there is a void in the particle. Magnification of the microphotographs in FIG. 2 is X625 and in FIGS. 3 and 4 is X125.

In reduced ilmenite, (FIG. 2) the iron 1 is seen to be embedded in a matrix of titanium oxide 2 which includes some voids 3. FIGS. 3 and 4 show particles obtained from the segregation step of embodiments of the process of the invention.

There is no visible iron in the larger particles which comprise titanium oxide 2 and voids 3. The iron 1 is seen to be in the form of smaller discrete particles when no attractant is used (FIG. 3). In FIG. 4 the iron 1 is associated with copper particles added as an iron attractant.

The claims defining the invention are as follows:

1. A process for the beneficiation of particles of titaniferous material comprising as a first component titanium oxide and as a second component metallic iron, said first and second components being in intimate association in said particles which process comprises first subjecting said particles to a non-oxidizing environment, said environment being characterized in that it is at an elevated temperature and comprises vapour derived from an iron chloride salt so that at least part of the said metallic iron is segregated by translocation from within said particles to the outside of said particles and secondly in a separation step separating the thus segregated metallic iron and relicts of said particles, wherein the particles of titaniferous material are the product of reduction of ores comprising iron titanium oxides, and substantially all of the iron component is reduced to the metallic state, wherein the elevated temperature used in said segregation step is in a range from the melting point of the iron salt to 1000° C., and wherein said segregation step takes place in the absence of a solid carbonaceous reducing agent and a flux.

2. A process for the beneficiation of pre-reduced particles of titaniferous material comprising as a first component titanium oxide and as a second component metallic iron, said first and second components being in intimate association in said particles which process comprises the steps of: (i) segregating at least part of said metallic iron from said pre-reduced particles by contacting said pre-reduced particles in a non-oxidizing environment at an elevated temperature with vapour derived from an iron chloride salt, whereby segregated metallic iron is translocated from within said particles to the outside of said particles; and (ii) separating the thus segregated metallic iron and relicts of said particles, wherein the elevated temperature used in said segregation step (i) is in a range from the melting point of the iron salt to 800° C.

3. A process according to claim 2 wherein said titaniferous material is ilmenite.

4. A process for the beneficiation of particles of titaniferous material comprising as a first component titanium oxide and as a second component metallic iron, said first and second components being in intimate association in said particles which process comprises first subjecting said particles to a non-oxidizing environment, said environment being characterized in that it is at an elevated temperature and comprises vapour derived from an iron chloride salt so that at least part of the said metallic iron is segregated by translocation from within said particles to the outside of said particles and secondly in a separation step separating the thus segregated metallic iron and relicts of said particles, wherein said segregation step takes place in the absence of a flux.

5. A process according to claim 4, wherein the said vapour is additionally derived from at least one iron halide chosen from the group consisting of ferrous fluoride, ferrous chloride, ferrous bromide and ferrous iodide.

6. A process according to claim 5 wherein the iron halide is generated in situ by reacting metallic iron with at least one halogen-containing substance selected from the group consisting of hydrogen chloride, hydrogen bromide, hydrogen iodide, chlorine, fluorine, bromine, iodine and ferric halides.

7. A process according to claim 4 wherein an iron attractant is present during the segregation step.

8. A process according to claim 7 wherein the iron attractant is a source of carbon chosen from the group consisting of carbon monoxide, coke, graphite and carbon-alloys.

9. A process according to claim 7 wherein the iron attractant is an element chosen from the group nitrogen, boron, phosphorus, silicon and sulphur and capable of forming an alloy or compound with iron.

10. A process according to claim 7 wherein the iron attractant is a transition metal.

11. A process according to claim 10 wherein the transition metal is chosen from the group consisting of nickel, copper and nickel-copper alloys.

12. A process according to claim 4 wherein the nonoxidising environment comprises a solvent for the iron salt chosen from the group consisting of sodium chloride, potassium chloride, magnesium chloride, calcium chloride and mixtures thereof.

13. A process according to claim 4 wherein in the said separation step the said segregated metallic iron and the said relicts are separated one from another by magnetic means.

14. A process according to claim 4 wherein the elevated temperature used in said segregation step is from 700° C. to 900° C.

15. A process according to claim 21 wherein the elevated temperature is in the range defined by the melting point of the iron salt up to 800° C.

16. A process according to claim 4 wherein the particles of titaniferous material are the product of reduction of ilmenite.

* * * * *